United States Patent
Szedlacsek

(10) Patent No.: US 9,341,462 B2
(45) Date of Patent: May 17, 2016

(54) SENSOR FOR MEASURING BLADE TIP CLEARANCE IN GAS TURBINES

(71) Applicant: Peter Szedlacsek, Winter Park, FL (US)

(72) Inventor: Peter Szedlacsek, Winter Park, FL (US)

(73) Assignee: Siemens Energy, Inc, Orlando, FL (US)

( * ) Notice: Subject to any disclaimer, the term of this patent is extended or adjusted under 35 U.S.C. 154(b) by 290 days.

(21) Appl. No.: 14/049,246

(22) Filed: Oct. 9, 2013

(65) Prior Publication Data

US 2015/0097582 A1  Apr. 9, 2015

(51) Int. Cl.
| | |
|---|---|
| *G01R 27/26* | (2006.01) |
| *G01B 7/14* | (2006.01) |
| *F01D 11/14* | (2006.01) |
| *F01D 17/02* | (2006.01) |
| *F01D 21/00* | (2006.01) |
| *F01D 21/04* | (2006.01) |
| *G01D 3/036* | (2006.01) |
| *G01D 5/241* | (2006.01) |

(52) U.S. Cl.
CPC *G01B 7/14* (2013.01); *F01D 11/14* (2013.01); *F01D 17/02* (2013.01); *F01D 21/003* (2013.01); *F01D 21/04* (2013.01); *G01D 3/0365* (2013.01); *G01D 5/241* (2013.01); *F05D 2270/80* (2013.01); *F05D 2270/802* (2013.01); *F05D 2270/803* (2013.01); *F05D 2270/821* (2013.01)

(58) Field of Classification Search
CPC ....... G01D 3/0365; G01D 5/241; G01B 7/14; F01D 11/14; F01D 17/02; F01D 21/003; F01D 21/04
See application file for complete search history.

(56) References Cited

U.S. PATENT DOCUMENTS

| | | | |
|---|---|---|---|
| 4,063,167 A | 12/1977 | Duly | |
| 6,692,222 B2 | 2/2004 | Prinz et al. | |
| 6,717,418 B2 | 4/2004 | Orenstein | |
| 7,688,081 B2 | 3/2010 | Webster | |
| 7,891,938 B2 | 2/2011 | Herron et al. | |
| 2006/0055415 A1* | 3/2006 | Takita | G01D 5/2417 324/658 |
| 2006/0125492 A1 | 6/2006 | Andarawis et al. | |

(Continued)

FOREIGN PATENT DOCUMENTS

| | | |
|---|---|---|
| EP | 1739387 A1 | 1/2007 |
| EP | 1972884 A1 | 9/2008 |

(Continued)

OTHER PUBLICATIONS

L.K. Baxter, Capacitive Sensors, 2000, available at http://www.capsense.com/capsense-wp.pdf.*
A.G. Sheard; Blade by Blade Tip Clearance Measurement; International Journal of Rotating Machinery; vol. 2011; Article ID 516128; Jun. 20, 2011; 13 pages.

*Primary Examiner* — Daniel Miller

(57) ABSTRACT

Determining a distance between stationary and moving portions of a turbo machine including generating, by a fixed gap capacitive probe, a first output signal based on a characteristic of a gas in a gas flow path of the turbo machine, wherein the fixed gap capacitive probe is located in the stationary portion and is configured to sense a characteristic of a gas flowing through the gas flow path. Also, a variable gap capacitive probe, located adjacent the fixed gap capacitive probe, is used to generate a second output signal based on a distance between the variable gap capacitive probe and the moving portion, wherein the variable gap probe is configured to capacitively couple to the moving portion of the turbo machine. Afterwards, the value of the second output signal can be adjusted based on the first output signal to produce an adjusted output signal.

20 Claims, 3 Drawing Sheets

(56) References Cited

U.S. PATENT DOCUMENTS

2006/0132147 A1   6/2006   Balasubramaniam et al.
2010/0077830 A1   4/2010   Andarawis et al.

FOREIGN PATENT DOCUMENTS

GB   1066057   4/1967
GB   1032215   6/1996

* cited by examiner

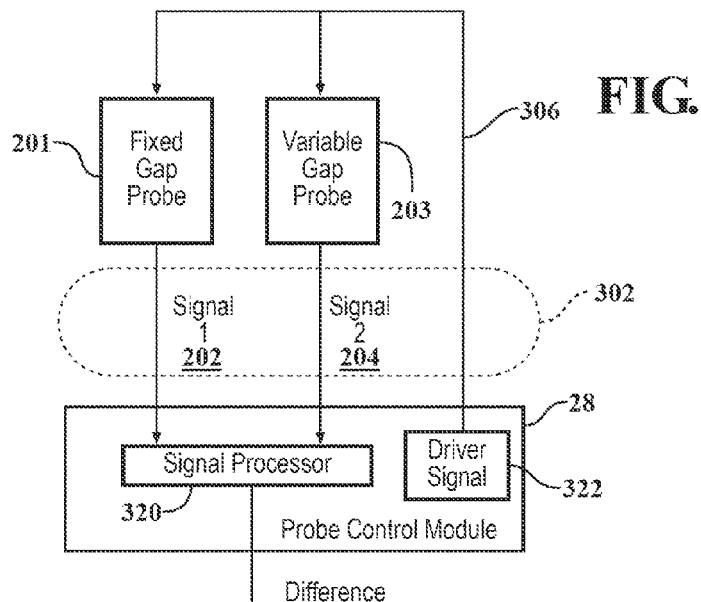
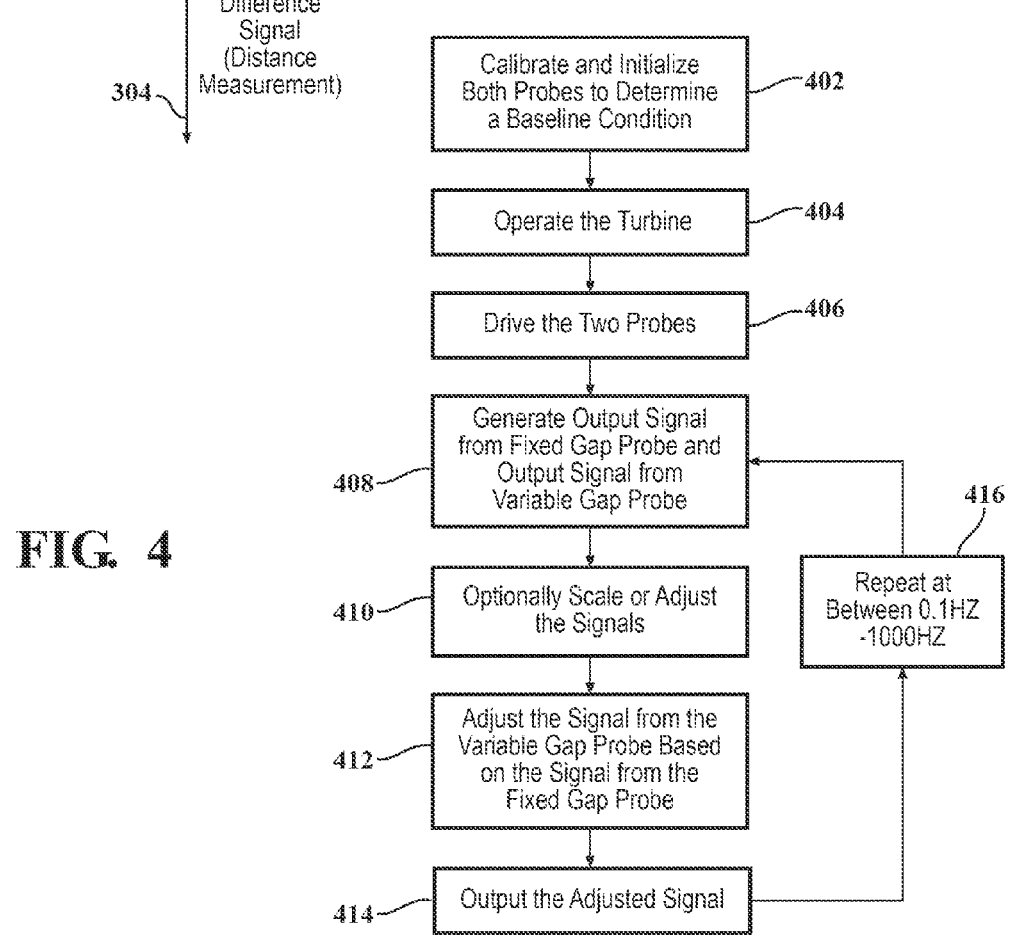
FIG. 3
FIG. 4

SENSOR FOR MEASURING BLADE TIP CLEARANCE IN GAS TURBINES

FIELD OF THE INVENTION

The present invention relates to the field of non-contact sensors and, more particularly to a non-contact capacitive distance measurement sensor adapted for use in a turbine engine.

BACKGROUND OF THE INVENTION

A high speed turbo machine, such as, for example, a steam or gas turbine, generally comprises a plurality of blades arranged in axially oriented rows, the rows of blades being rotated in response to the force of a high pressure fluid flowing axially through the machine. It is common to monitor the position of the blades relative to a flowpath wall within the turbine, both during the design and testing of the turbine and during normal operation of the turbine. For example, it is known to use non-contacting proximity sensors or probes to detect a gap distance between the blade tips and the flowpath wall, as well as detect blade vibrations.

In addition, control of blade-tip clearance in the compressor and turbine sections of gas turbine engines can improve efficiency, minimize leakage flow, and shorten engine development time. Tip clearance varies throughout different operating conditions (e.g., start-up, idle, full power, shut-down) because of different radial forces and different thermal expansion coefficients and heat transfer. A real-time clearance control system can lead to turbine designs that eliminate rubbing of the housing and minimize leakage flow for maximum engine efficiency. In particular, in a turbine design that features hydraulic clearance optimization (HCO), measurement of blade tip clearance can be especially beneficial.

One conventional proximity sensor includes a capacitance gap sensor that has a single sensing electrode that is energized by a voltage so as to generate an electric field in the expected path of a turbine blade. The sensor is located within a cavity of the turbine casing near where a blade will pass. The blade and casing of the turbine provide a virtual ground for the electrode such that the electrode and the blade act as a capacitor. When a turbine blade passes through the generated electric field, the capacitance between the electrode and the blade changes. A magnitude of the change in the capacitance between the electrode and the virtual ground is used as an indicator of a proximity of the turbine blade to the electrode.

The above approach has a number of drawbacks. In particular, the ambient conditions where the sensor is located affects the magnitude of a resulting change in the sensor's capacitance. Furthermore, the conditions within a turbine, such as near the first and second row, may reach temperatures of about 2500 C or more. Operation in such an environment can degrade the performance of a conventional capacitance gap sensor such that it may fall out of calibration in a matter of days or weeks. This is especially the case in gas turbine applications where it is critical to measure blade clearances in the turbine during the whole operation cycle. The sensor should be capable of working in environments including ambient air at atmospheric pressure during engine start up, in vitiated air that is the exhaust gas from the combustor with pressures in the 20-30 bar range and temperatures in the range of 1200 C to 1500 C at base load operation, and in hot air at quickly varying pressure and temperature during engine shut down.

Accordingly, there is currently an unmet need for a proximity sensor, for example a turbine blade proximity sensor, which provides accurate results in a variety of environments, over a relatively long period of time without re-calibration.

SUMMARY OF THE INVENTION

One aspect of the present invention relates to a method for determining a distance between a stationary portion of a turbo machine that defines a gas flow path and a moving portion of the turbo machine within the gas flow path. The method includes generating, by a fixed gap capacitive probe, a first output signal based on a characteristic of a gas in the gas flow path, wherein the fixed gap capacitive probe is located in the stationary portion of the turbo machine and is configured to sense a characteristic of a gas flowing through the gas flow path. Also, a variable gap capacitive probe, located adjacent the fixed gap capacitive probe, is used to generate a second output signal based on a distance between the variable gap capacitive probe and the moving portion, wherein the variable gap probe is configured to capacitively couple to the moving portion of the turbo machine. Afterwards, the value of the second output signal can be adjusted based on the first output signal to produce an adjusted output signal.

Another aspect of the present invention relates to a proximity sensor for determining a distance between a stationary portion of a turbo machine that defines a gas flow path and a moving portion of the turbo machine within the gas flow path. The proximity sensor includes a fixed gap capacitive probe located in the stationary portion of the turbo machine and configured to sense a characteristic of a gas flowing through the gas flow path and to generate a first output signal based on the characteristic of the gas. The sensor also includes a variable gap capacitive probe located adjacent the fixed gap capacitive probe, wherein the variable gap probe is configured to capacitively couple to the moving portion of the turbo machine and to generate a second output signal based on a distance between the variable gap capacitive probe and the moving portion. A signal processor is also included that is configured to adjust a value of the second output signal based on the first output signal to produce an adjusted output signal.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 3 illustrates a block level diagram of a sensor with at least two probe heads in accordance with the principles of the present invention; and FIG. 4 depicts a flowchart of an exemplary process for measuring blade tip clearance in accordance with the principles of the present invention.

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
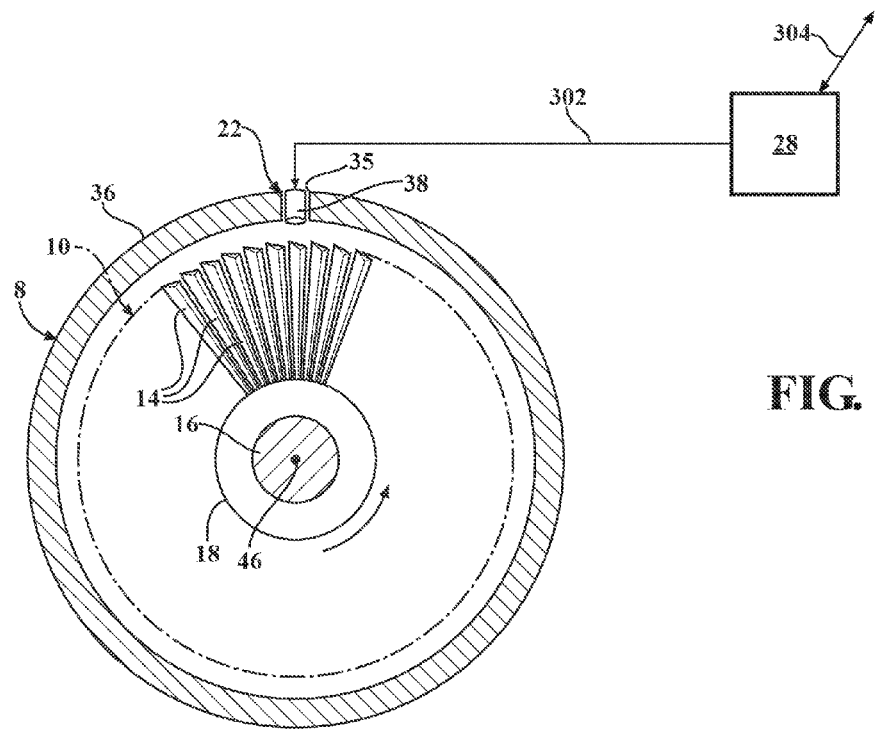
FIG. 1 is a diagrammatic view illustrating a turbine and a proximity sensor probe in accordance with the principles of the present invention.

FIG. 1 diagrammatically illustrates a turbine 8 including a shrouded turbine blade row 10 in which the embodiments of the present invention can be employed in a proximity sensor for a blade tip clearance monitoring system to monitor and/or measure a distance between a blade tip and a turbine's casing. While the detailed description below may provide, by way of example, a proximity sensor located in the turbine section of a turbo machine, one of ordinary skill will readily recognize that the proximity sensor can also be used in a similar fashion in a compressor section to measure a blade tip clearance between a blade tip and the compressor casing or housing. Turbine blades 14 are connected to a rotor 16 by means of a rotor disk 18.

A proximity sensor probe 22 in accordance with the principles of the present invention is also shown in FIG. 1. In the illustrated embodiment, one exemplary probe sensor 22 is shown. However, embodiments of the present invention also contemplate a plurality of individual probe sensor structures or probes in circumferentially spaced relation to each other for monitoring the proximity of the turbine blades 14. Similarly, respective probe sensors 22 can be located at different turbine blade row locations spaces axially along the axis of rotation 46.

Referring to FIG. 1, the probe 22 may be located in an opening 35 of a casing or wall portion 36 of the turbine 8. This opening 35 can be a through-opening that passes entirely through the wall portion 36 or the opening 35 may be a cavity that only partially passes through the wall portion 36. The probe includes a sensor 38 near a tip of the turbine blades 14. For example, the sensor 38 may be spaced such that when a turbine blade 14 is at its closest location relative the sensor 38, they are spaced by about 1 to 10 mm. At its furthest distance, the sensor 38 may be spaced approximately 250 mm from a tip of a turbine blade 14.

The mounting of the probe sensor structure 22 through the wall portion 36 of the turbine 8 may be provided in a conventional manner. As described below, a probe control module 28 produces a signal 306 (FIG. 2A) that is applied to the sensor 38 through a communication medium 302 (e.g., shielded coaxial cable). As the blades 14 rotate about an axis 46, the proximity of the sensor 38 to one of the turbine blades 14 produces a change in a signal 304 produced by a probe control module 28. The produced signal 304 can then be used to determine a distance from the sensor 38 to a nearby turbine blade 14. This proximity information 304 can be communicated (e.g., via a communications channel) to a vibration monitoring system, a HCO system, or other monitoring systems.

Figure 2A:
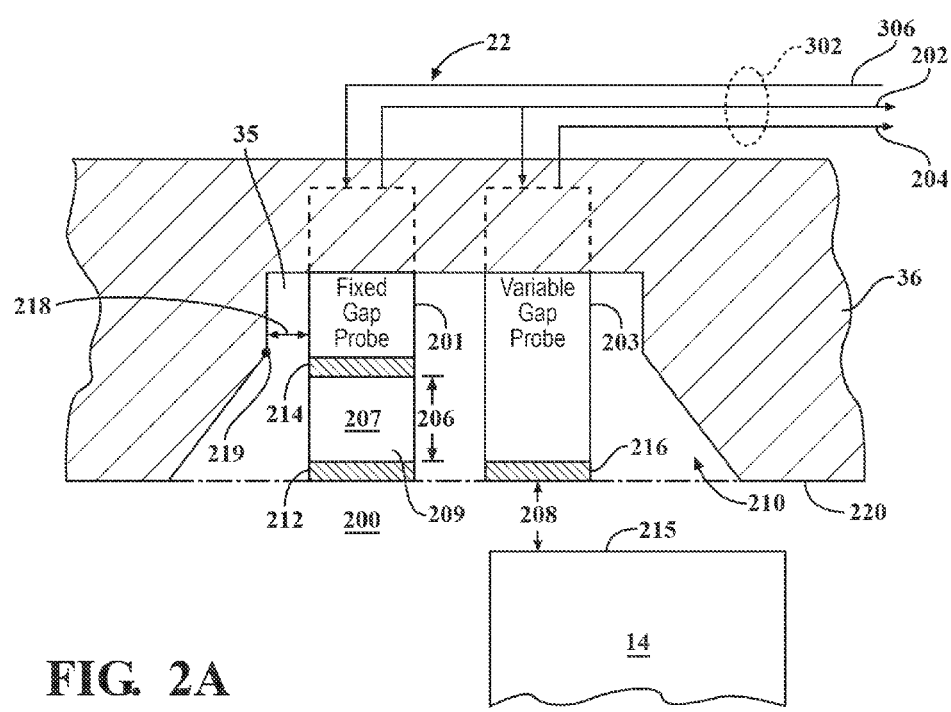
FIG. 2A is a more detailed view of the sensor probe of FIG. 1 in accordance with the principles of the present invention.

FIG. 2A is a more detailed view of a sensor probe 22 in accordance with the principles of the present invention. In particular, FIG. 2A reveals that the probe 22 includes at least two capacitance sensors located within the opening 35. As shown, one of the capacitance sensors is a fixed gap probe 201 and another sensor is a variable gab probe 203.

While one of ordinary skill will recognize that a wide variety of non-contact capacitance sensors can be used without departing from the scope of the present invention, a particular example embodiment is described so as to make possible operational details more concrete and clear. However, the example capacitance sensors and operations are not intended to limit the scope of the present invention to only this example. If two conductive surfaces are separated by a distance (i.e., a gap) and a voltage is applied to one of the surfaces, an electric field is created because of the difference in charges stored on each of the surfaces. Capacitance refers to the ability of the surfaces to hold a charge. If a constant current is applied, the capacitance change can be monitored as a linear voltage change related to the distance between the two surfaces. In particular, capacitance is calculated according to:

$$C=[(\text{area of the surfaces}) \times (\text{gap dielectric constant})/\text{gap distance}] \qquad \text{EQ. 1}$$

For the fixed gap capacitive probe 201, there are two conductive surfaces or plates 212, 214 spaced apart a known distance 206. As is known in the art, there is a non-conductive frame or structure 209 that rigidly connects the two surfaces or plates 212, 214 to one another at a predetermined distance in a way so as to form a relatively open gap region 207 through which an ambient medium 200 can flow. In this type of probe, the area of the surfaces 212, 214 is fixed and the distance 206 between the surfaces 212, 214 is fixed. Thus, according to EQ. 1 above, if the capacitance measured between the surfaces or plates 212, 214 changes, then that change is due to a change in the dielectric constant of the ambient medium 200.

For the variable gap probe 203, one of the conductive surfaces or plates 216 is located near where a turbine blade tip 14 will pass. The tip 215 of the turbine blade 14 acts as a second conductive surface, or plate, to form a capacitor with a gap distance of 208. Assuming that the area of the surface or plate 216 remains constant and the dielectric constant of the ambient medium 200 remains constant, then a capacitance measured by the variable gap probe 203 will vary based on the distance 208 between the probe and the tip 215 of the turbine blade 14.

As discussed in further detail below, the two capacitance probes 201, 203 may transmit and receive electrical signals via a communications medium 302. In particular, a driving signal 306 (e.g., a constant current signal) can be supplied to each of the probes 201, 203. In response, the fixed gap probe 201 can provide a voltage signal 202 that varies as the capacitance between the surfaces 212, 214 varies; and the variable gap probe 203 can provide a voltage signal 204 that varies as its measured capacitance value varies.

When the turbine is in operation, the casing wall 36 defines a gas flow path and the turbine blade 14 moves within this gas flow path. The gas that flows through the gas flow path defined by the casing wall 36 is an ambient medium 200 that exists between the two plates 212, 214 of the fixed gap probe 201 and between the blade tip 215 and the plate 216 of the variable gap sensor 203. To assist the ambient medium 200 that occupies the region between the conductive surface 216 and the turbine blade tip 215 to be similar in composition to that which is between the conductive surfaces 212, 214 of the fixed gap probe 201, the opening 35 may be designed sufficiently large to permit passage of gases to the probe 201, such as by providing an edge 210 that flares outwardly from a radial line. A transition point 219 between a radial section of the opening 35 and the flared portion 210 can be such that it is approximately at the same height as the top conductive surface 214 of the fixed gap probe. For example, this height can be about 10 mm. Thus, at the bottom end of the opening 35, its inside diameter may be larger than that of the top end of the opening 35. A distance 218 between the probes (either one) and an adjacent sidewall of the opening 35 can vary without departing from the scope of the present invention.

In FIG. 2A, the conductive surface 216 of the variable gap probe 203 is shown as being located substantially aligned with an inner surface 220 of the casing wall 36. This positioning allows a distance measure by the variable gap probe 203 to be more easily correlated to the distance between the casing 36 and the tip 215 of turbine blade 14. However, one of ordinary skill will recognize that such alignment is not required and that other positions of the variable gap probe 203 can be accounted for through appropriate calibration.

Figure 2B:
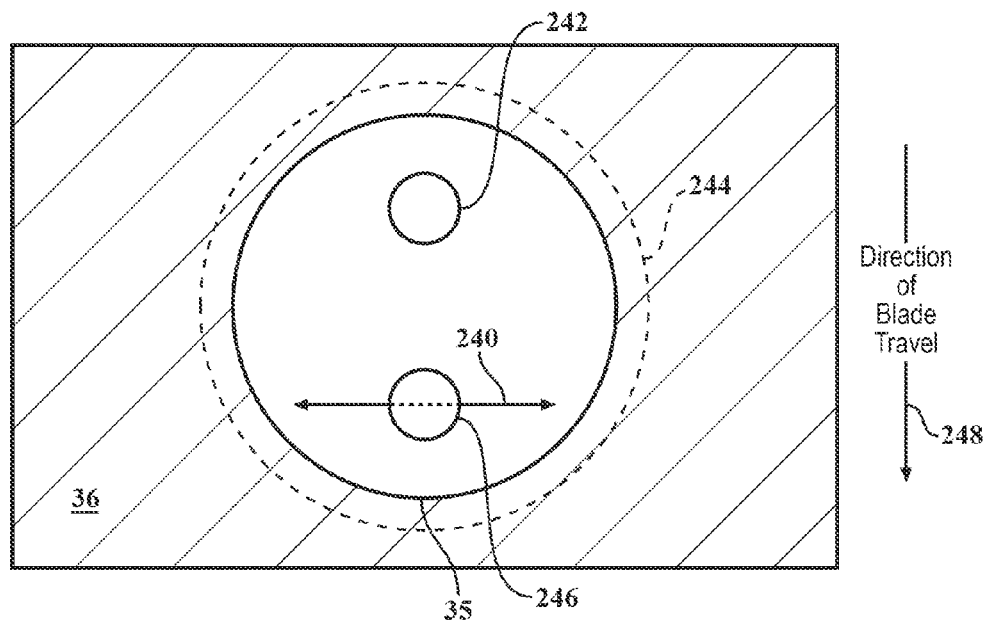
FIGS. 2B and 2C depict two different top views of the sensor probe of FIG. 1 in accordance with the principles of the present invention.
Figure 2C:
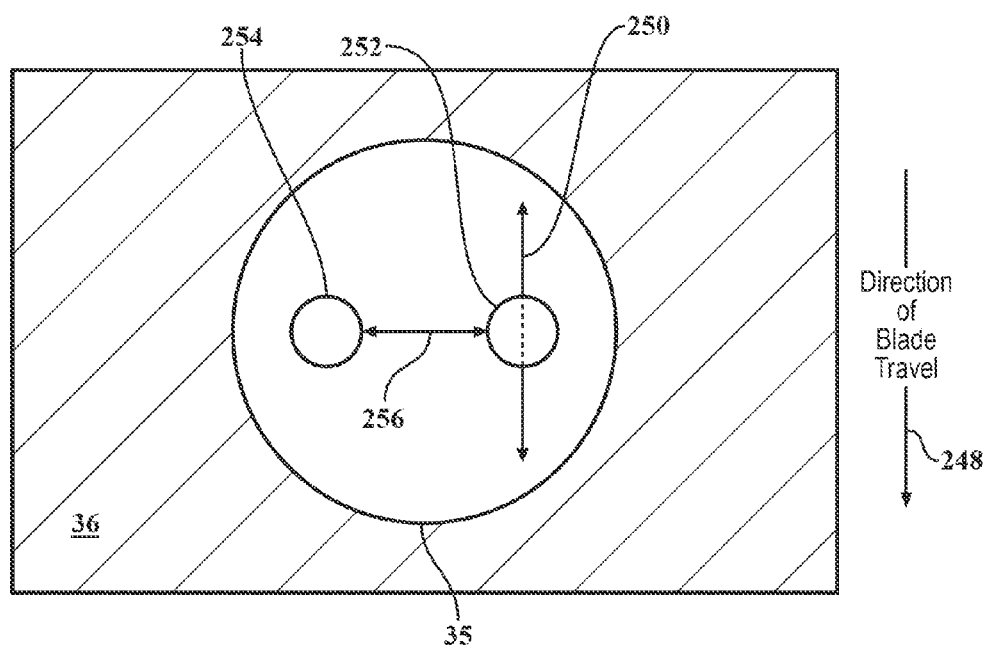

FIGS. 2B and 2C depict two different top views of the sensor probe 22 in accordance with the principles of the present invention. In FIG. 2B, a first probe 242 may be either the fixed gap probe 201 or the variable gap probe 203 and a second probe 246 is whatever type of probe (e.g., 201 or 203) that the first probe 242 is not. The travel direction 248 of the turbine blade 14 is shown so that the fixed position of the two probes 242, 246 are approximately aligned in that direction 248. However, one of ordinary skill will recognize that the fixed location of second probe 246 may be shifted along a direction 240 without departing from the scope of the present invention.

In FIG. 2C, a first probe 254 may be either the fixed gap probe 201 or the variable gap probe 203 and a second probe 252 is whatever type of probe (e.g., 201 or 203) that the first probe 254 is not. The travel direction 248 of the turbine blade 14 is shown so that the fixed position of the two probes 252, 254 are approximately aligned parallel to that direction 248. However, one of ordinary skill will recognize that the fixed location of second probe 252 may be shifted along a direction 250 without departing from the scope of the present invention. Also, a distance between the probes 252, 254 may vary, to the extent that they are both exposed to the same ambient medium 200, without departing from the scope of the present invention.

The dashed line 244 of FIG. 2B shows the inside diameter of the opening 35 caused by the flare 210 which helps or effects a flow of the ambient medium 200 which occupies the gap between the variable gap probe 203 and the turbine blade tip 215 to also be present in-between the two surfaces 212, 214 of the fixed gap probe 201.

FIG. 3 illustrates a block level diagram of a sensor with at least two probe heads in accordance with the principles of the present invention. A probe control module 28 may include circuitry 322 for producing a driver signal 306 as well as other circuitry 320 to receive and process signals. While there could be respective circuitry (not shown) to produce two different drive signals 306, one for each of the probes 201, 203, producing a single drive signal to concurrently drive both of the probes 201, 203 reduces the noise floor of the system. Also, having the two probes 201, 203 share a common grounded plate can help reduce noise as well.

In response to being driven, each of the probes 201, 203 will produce a respective response signal: "signal 1" 202 and "signal 2" 204. The response signals 202, 204 indicate a respective capacitance measured, or sensed, by each of the probes 201, 203. As is known in the art, a capacitance probe may have internal filters and amplifiers to convert a measured capacitance change into an output voltage signal. The output voltage signal from a capacitance probe is what the response signals 202, 204 are referring to. An amount of change in an output voltage signal for a given gap distance change is commonly referred to as the sensitivity of the capacitance probe. For example, if a capacitance probe is designed such that a gap distance change of 1 mm corresponds to an output voltage change of 10 volts, then the sensitivity of that probe would be (1 mm)/(10V) or 0.1 mm/V.

In describing FIG. 2A, the variable gap probe 203 was initially described for simplicity purposes as measuring a capacitance that varies based on the distance between the surface 216 and the turbine blade tip 215. In reality, that capacitance also depends on the dielectric constant of the material which comprises the gap between the probe 203 and the blade 14 (i.e., the gas, or ambient medium 200, flowing through the gas flow path defined by a casing wall). While aspects of the present invention are applicable to either the compressor section of a turbo machine or the turbine section of a turbo machine, certain ones of those aspects are particularly beneficial within the turbine section.

In the turbine section, the ambient medium 200 that occupies the gap between the sensor 203 and the blade 14 changes dramatically during operation of the turbine. In a conventional capacitance sensor, distortion, known as "flame noise", of the measured signal can therefore occur. In contrast, a capacitive sensor in accordance with the principles of the present invention can reduce or eliminate any medium related variation of a measured capacitance. The fixed gap probe 201 has a gap distance that does not change during operation. The variable gap probe 203 is co-located with, or adjacent to, the fixed gap sensor 201. Because both probes are next to one another they are exposed to substantially the same ambient medium 200 at all times during operation of the turbine. The signal 202 output from the fixed gap probe 201 in an operating turbine will reflect variations related to changes in the ambient medium. The signal 204 output from the variable gap probe 203 is affected by both changes in the blade tip clearance and changes to the ambient medium during operation. Subtracting the signal 202 from the signal 204 will provide a difference signal 304 that reflects only changes in the blade tip clearance.

In FIG. 3, the signals 202 and 204 can be provided to a signal processor 320 (e.g., either analog or digital) of the probe control module 28 and combined in such a way as to produce the difference signal 304. Assuming the respective sensitivity of each of the probes 201, 203 is the same (e.g. 1.0 mm/V), then the two signals can be easily combined to produce the difference signal 304. For example, if an initial output voltage signal 202 from the fixed gap probe 201 is 5V and an output signal 204 from the variable gap probe 203 is calibrated to be 8V when the blade tip 215 is a known distance from the sensor 203, then a difference signal 304 of 3V indicates the blade tip clearance is at that known, calibrated distance. If, at some later time during operation of the turbine, the output voltage signal 202 from the fixed gap probe 203 climbs to 7V and the output voltage signal 204 from the variable gap probe 203 climbs to 12V, then the difference signal 304 is calculated to be 5V. In other words, although the variable gap probe output signal 204 changed by 4V the difference signal 304 only changes by 2V; which accurately reflects the change to the output signal 204 caused by the blade tip clearance changing. By adjusting the output signal 204 based on the fixed gap probe output signal 202, any change due to variations in the ambient medium can be accounted for. In this example, based on the hypothetical sensitivity value, the 2V change indicates that the blade tip clearance has increased by 2 mm from the known, calibrated distance.

A more complicated example would be if the respective sensitivities of the two probes were different. In this instance, the signal processor 320 would scale one of the signals 202, 204 accordingly so that they could be combined in a meaningful manner. For example, if the fixed gap probe 201 had a sensitivity of 2 mm/V and the variable gab probe 203 had a sensitivity of 1 mm/V, then scaling one of the output signals 202, 204 would be beneficial before combining them. In this hypothetical example, changes in the ambient medium 200 that result in the fixed gap probe 201 increasing its output signal 202 from 5V to 6V would indicate that the fixed gap probe detects changes equivalent to a gap increase of 2 mm. Concurrently, the operating conditions might cause the variable gap probe 203 to increase its output signal from 8V to 11V.

Because of the different sensitivities of the two probes 201, 203, the 1V increase of the output signal 202 is equivalent to a 2V increase in the output signal 204. Thus, the output signal 202 is doubled by the signal processor 320 before it is subtracted from the output signal 204. The result is that the difference signal 304 in this example is 1V and indicates that the blade tip clearance has increased by 1 mm during operation.

FIG. 4 depicts a flowchart of an exemplary process for measuring blade tip clearance in accordance with the principles of the present invention. In step 402, the fixed gap probe 201 and the variable gap probe 203 are installed within the turbine casing and calibrated to determine a baseline output signal. Conceptually, calibration could be performed during the manufacturing process as well. Ultimately, the goal is to determine the baseline difference signal 304 that corresponds to a known distance between the variable gap probe 203 and the tip 215 of the turbine blade 14. Once calibration is completed, then in step 404 the turbine can be operated and the two probes 201, 203 can be electrically driven (in step 406) in order to produce output signals 202, 204.

In step 408, the respective output signals 202, 204 are generated using the two probes 201, 203 and received by the signal generator 320. As described in the second example above, one of the output signals 202, 204 may optionally be scaled, in step 410. In step 412, the value of the output signal 204 from the variable gap probe 203 is adjusted based on the value of the output signal 202 from the fixed gap probe 201. For example, the output signal 202 can be subtracted from the output signal 204 to produce an adjusted signal (e.g., the difference signal 304). In step 414, the adjusted signal (which is indicative of blade tip clearance) is provided to external monitoring modules that may relate to HCO control, maintenance condition logging, or other similar equipment.

The distance monitoring/measuring process described in the flowchart of FIG. 4 repeats in step 416 so that the distance between a casing wall and a turbine blade tip 215 can be continually assessed during operation of the turbine. Depending on the purpose for which the blade tip clearance monitoring is being performed, the rate of sampling the value of the adjusted signal can vary. For example, as shown in step 416, the adjusted signal can be calculated and output at a rate of every 10 seconds (i.e., 0.1 Hz) or as often as every millisecond (i.e., 1000 Hz). One of ordinary skill will recognize that this rate of repetition can vary without departing from the scope of the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A proximity sensor for determining a distance between an inner surface of a stationary portion of a turbo machine that defines a gas flow path and a moving portion of the turbo machine within the gas flow path, comprising:
a fixed gap capacitive probe located within a cavity defined in the stationary portion of the turbo machine and configured to sense a characteristic of a gas flowing through the gas flow path and to generate a first output signal which varies based on the characteristic of the gas, the fixed gap capacitive probe having a pair of radially spaced conductive plates wherein a radially innermost conductive plate is located within the cavity radially outward from the inner surface of the stationary portion;
a variable gap capacitive probe located within the cavity adjacent the fixed gap capacitive probe, wherein the variable gap probe is configured to capacitively couple to a moving blade of the turbo machine and to generate a second output signal which varies based on a distance between the variable gap capacitive probe and the moving blade of the turbo machine; and
a signal processor configured to adjust a value of the second output signal based on the first output signal to produce an adjusted output signal.

2. The proximity sensor of claim 1, further comprising:
a signal source configured to electrically drive the fixed gap capacitive probe to produce the first output signal, and further configured to electrically drive the variable gap capacitive probe to produce the second output signal.

3. The proximity sensor of claim 1, wherein the moving portion comprises a blade within one or more of a compressor section or a turbine section of the turbo machine.

4. The proximity sensor of claim 1, wherein the signal processor is configured to subtract the first output signal from the second output signal to produce the adjusted output signal.

5. The proximity sensor of claim 1, wherein the cavity in the stationary portion of the turbo machine comprises a first end opposite a second end, the second end extending radially outward from the inner surface of the stationary portion and defining a flared portion toward the first end, and the second end adjacent to the inner surface having an inside diameter greater than an inside diameter of the first end.

6. The proximity sensor of claim 5, wherein the two conductive plates of the fixed gap capacitive probe are held in spaced relation by a non-conductive frame and the greater inside diameter of the second end effects a flow of the gas into a space between the two conductive plates, wherein the characteristic of the gas comprises the gas's dielectric constant.

7. The proximity sensor of claim 1, wherein the fixed gap capacitive probe has a first sensitivity and the variable gap capacitive probe has a second sensitivity, the second sensitivity different than the first sensitivity.

8. The proximity sensor of claim 1, wherein the fixed gap capacitive probe has a first sensitivity and the variable gap capacitive probe has a second sensitivity, the second sensitivity substantially equal to the first sensitivity.

9. The proximity sensor of claim 1, wherein the signal processor is further configured to output the adjusted signal as an indicator of the distance between the stationary portion of the turbo machine that defines a gas flow path and the moving portion of the turbo machine within the gas flow path.

10. A method for determining a distance between an inner surface of a stationary portion of a turbo machine that defines a gas flow path and a moving portion of the turbo machine within the gas flow path, comprising:
generating, by a fixed gap capacitive probe, a first output signal which varies based on a characteristic of a gas in the gas flow path, wherein the fixed gap capacitive probe is located within a cavity defined in the stationary portion of the turbo machine and configured to sense a characteristic of a gas flowing through the gas flow path, the fixed gap capacitive probe having a pair of radially spaced conductive plates wherein a radially innermost conductive plate is located within the cavity radially outward from the inner surface of the stationary portion;

generating, by a variable gap capacitive probe located within the cavity adjacent to the fixed gap capacitive probe, a second output signal which varies based on a distance between the variable gap capacitive probe and a moving blade of the turbomachine, wherein the variable gap probe is configured to capacitively couple to the moving blade of the turbo machine; and adjusting a value of the second output signal based on the first output signal to produce an adjusted output signal.

11. The method of claim 10, further comprising:
electrically driving the fixed gap capacitive probe to produce the first output signal and the variable gap capacitive probe to produce the second output signal.

12. The method of claim 10, wherein the moving portion comprises a blade within a compressor section of the turbo machine.

13. The method of claim 10, wherein the moving portion comprises a blade within a turbine section of the turbo machine.

14. The method of claim 10, wherein adjusting the value of the second output signal comprises:
subtracting first output signal from the second output signal to produce the adjusted output signal.

15. The method sensor of claim 10, wherein the characteristic of the gas comprises the gas's dielectric constant.

16. The method of claim 10, wherein the cavity in the stationary portion of the turbo machine comprises a first end opposite a second end, the second end extending radially outward from the inner surface of the stationary portion and defining a flared portion toward the first end, and the second end adjacent to the inner surface having an inside diameter greater than an inside diameter of the first end.

17. The method of claim 10, wherein the fixed gap capacitive probe has a first sensitivity and the variable gap capacitive probe has a second sensitivity, the second sensitivity different than the first sensitivity.

18. The method of claim 10, wherein the fixed gap capacitive probe has a first sensitivity and the variable gap capacitive probe has a second sensitivity, the second sensitivity substantially equal to the first sensitivity.

19. The method of claim 10, further comprising:
outputting the adjusted signal as an indicator of the distance between the stationary portion of the turbo machine that defines a gas flow path and the moving portion of the turbo machine within the gas flow path.

20. A proximity sensor for determining a distance between an inner surface of a stationary portion of a turbo machine that defines a gas flow path and a moving portion of the turbo machine within the gas flow path, comprising:

a fixed gap capacitive probe located in the stationary portion of the turbo machine and configured to sense a characteristic of a gas flowing through the gas flow path and to generate a first output signal which varies based on the characteristic of the gas, the fixed gap capacitive probe having a pair of radially spaced conductive plates wherein a radially innermost conductive plate is located within the cavity radially outward from the inner surface of the stationary portion;

a variable gap capacitive probe located adjacent the fixed gap capacitive probe, wherein the variable gap probe is configured to capacitively couple to the moving portion of the turbo machine and to generate a second output signal which varies based on a distance between the variable gap capacitive probe and the moving portion; and a signal processor configured to adjust a value of the second output signal based on the first output signal to produce an adjusted output signal;

wherein the fixed gap capacitive probe and the variable gap capacitive probe are located within a cavity in the stationary portion of the turbo machine; wherein the cavity in the stationary portion of the turbo machine comprises a first end opposite a second end, the second end extending radially outward from the inner surface of the stationary portion and defining a flared portion toward the first end, and the second end adjacent to the inner surface having an inside diameter greater than an inside diameter of the first end.

* * * * *